United States Patent [19]

Iwatsuka

[11] Patent Number: 5,262,051
[45] Date of Patent: Nov. 16, 1993

[54] APPARATUS FOR BIOLOGICAL TREATMENT OF WATER AND WASTE, OF THE ATTACHED-GROWTH TYPE

[75] Inventor: Takeshi Iwatsuka, Saitama, Japan

[73] Assignee: Japan Organo Co., Ltd., Tokyo, Japan

[21] Appl. No.: 846,616

[22] Filed: Mar. 5, 1992

[30]  Foreign Application Priority Data

Mar. 8, 1991 [JP] Japan .................................. 3-43576

[51] Int. Cl.$^5$ .............................................. C02F 3/06
[52] U.S. Cl. .................................. 210/615; 210/150; 210/220; 210/620; 261/122.1; 261/123
[58] Field of Search ............... 210/150, 151, 615, 220, 210/483, 620, 221.2; 261/121.1, 122, 123, 124

[56]  References Cited

U.S. PATENT DOCUMENTS

| | | | |
|---|---|---|---|
| 3,231,490 | 1/1966 | Fry | 210/615 |
| 3,700,590 | 10/1972 | Burton | 210/150 |
| 4,088,571 | 5/1978 | Helgesson | 210/150 |
| 4,231,863 | 11/1980 | Sutphin | 210/151 |
| 4,416,993 | 11/1983 | McKeown | 210/150 |
| 4,422,930 | 12/1983 | Hatanaka | 210/150 |
| 4,886,601 | 12/1989 | Iwatsuka et al. | 210/321.79 |
| 5,085,766 | 2/1992 | Born | 210/150 |

FOREIGN PATENT DOCUMENTS 63-240992 10/1988 Japan .
2-252094 2/1990 Japan .
2-227189 9/1990 Japan .

OTHER PUBLICATIONS

W. W. Eckenfelder, Jr. and D. J. O'Connor "Biological Waste Treatment" Theory and Practice of Aeration Manhattan College Civil Engineering Dept. (New York) 1962, pp. 76–120.

Primary Examiner—Christopher Upton
Attorney, Agent, or Firm—Cushman, Darby & Cushman

[57] ABSTRACT

An apparatus for biological treatment of water and waste of the attached-growth type, constructed by disposing long fiber bundles formed by binding a large number of monofilaments, upward and downward in a zigzag formation in a vessel, fixing substantially the upper and lower angle portions thereof, and particularly incorporating supports for supporting the angle portions of the long fiber bundles disposed upward and downward in a zigzag formation, into a part of a frame assembled in advance together with frame members, the apparatus being capable of high-volume treatment, causing little clogging, lowering construction costs, and capable of stable long-term operation.

7 Claims, 6 Drawing Sheets

APPARATUS FOR BIOLOGICAL TREATMENT OF WATER AND WASTE, OF THE ATTACHED-GROWTH TYPE

BACKGROUND OF THE INVENTION

1. Field of the Invention

This invention relates to an apparatus for biological treatment in which a water containing organic matter and/or nitrogenous compounds, such as waste water, is biologically treated. Specifically, a biological treatment apparatus of the attached-growth type in which biological treatment is effected under aerobic or anaerobic conditions by microorganisms growing on a medium packed in a vessel.

2. Description of the Prior Art

As apparatus for removing organic matter (e.g. BOD, COD, etc.) contained in waste water, etc. by making use of the metabolism of organisms or for nitrating or denitrificating nitrogenous compounds (e.g. $NH_4$-N, $NO_3$-N, etc.), biological treatment apparatus of the suspended-growth type and those of the attached-growth type are broadly known. The biological reactions are conducted by taking advantage of microorganisms inherently present in the water and waste (hereinafter referred to as "water") to be treated.

In the apparatus of the attached-growth type, there are four common species, i.e., trickling filters, roughing filters, rotating biological contactors and packed-bed reactors. Based on the mechanisms involved, the present apparatus is classified into the attached-growth type and may be similar to the packed-bed reactors. Thus, hereinafter, descriptions of the prior art will be focused on the packed bed reactors. Generally, in the packed-bed reactor, a bed of a packing medium such as gravel, macadom, artificial porous stones (e.g. sintered aggregate), anthracite, or plastics of various shapes including honeycomb shape, is provided in a vessel, through which bed the water containing organic matter, nitrogenous compounds, etc. is passed to effect biological decomposition/removal by the function of microorganisms (aerobic or anaerobic microorganisms) which are inherently present in the water and which settle and grow on the packing medium. Thus, in the apparatus of the packed-bed type, the concentration of microorganisms in the vessel can be made higher than in the biological treatment apparatus of the suspended-growth type, so that a high load treatment is possible for substances such as organic matter and nitrogenous compounds. Moreover, operation control is easy and the rate of removal can also be adjusted at will.

However, the apparatus of the packed-bed type has defects in that a continued treatment may cause thickening of organism films grown on the packing medium or clogging of the packing medium by the accumulation of suspended solids (referred to as "SS") from the water being treated, as a result of which a desired flow of water can not be secured and in the case of a treatment by aerobic microorganisms, the growth of anaerobic microorganisms occurs and the quality of the treated water is hence deteriorated. In consequence, periodical washing operation becomes necessary whereby washing water or washing gas is passed through the bed of packing medium to eliminate clogging of the medium.

The need for this washing entails the following problems. Namely, when granular materials such as gravel and macadom (having granular sizes of approx. 13 to 30 mm in general) are used as a packing medium in an apparatus of the packed-bed type, clogging of the medium is liable to occur due to its reduced void ratio, thus leading to an increased frequency of required washing. Further, the packing mediums of gravel, macadom and the like have relatively large specific gravities (generally approx. 2.2 to 2.6), so that it is difficult to fluidize the bed of the medium by passing washing water or washing gas therethrough and hence elimination of the clogging is not easy. On the other hand, in an apparatus of the packed-bed type using packing mediums of artificial stones, anthracite, etc., which have relatively small specific gravities (generally approx. 1.1 to 1.5), there is an increasing tendency of the packing mediums flowing out of the vessel, when the flow rate of washing fluid is increased for the purpose of securing sufficient washing effects. On the other hand, decreasing the washing flow rate results in insufficient washing and a prolonged time of washing. Thus, the apparatus involves problems in that their proper operation is not easy owing to large restrictions in washing operation and washing conditions in practical aspects.

Plastics formed in various shapes including honeycomb shape with large void ratios may also be used as the packing media in order to minimize their clogging and to permit their easy washing. However, a packing medium with a larger void ratio has a smaller surface area per unit volume ($m^2/m^3$: hereinafter simply referred to as "surface area") of the packing medium. Therefore, the area for growing microorganisms is smaller and hence the concentration of microorganism may not become high in the vessel, thus inviting the reduction of the efficiency of biological treatment.

In view of these facts, the applicant developed and proposed a novel apparatus for biological treatment using monofilaments as a carrier or a medium on which microorganisms can settle and grow, so that the above various problems were solved (Japanese Patent Laid-open No. 227189/1990).

The apparatus for biological treatment according to this proposal is characterized by the constitution in which a medium for microorganisms to settle and grow thereon made of bundles of long fiber as an aggregate of individual monofilaments are formed in a vessel in such a way that the lower ends of the bundles are fixed near the bottom of the vessel and the upper ends thereof are made free. Use of this apparatus not only increases significantly the concentration of microorganisms in the vessel but also minimize clogging of the medium. Even if clogging occurs, it can be eliminated by very simple washing.

Compared to the packed-bed reactors, a variety of merits are seen in the above-proposed apparatus of the attached-growth type, in which fiber bundles, whose lower ends are fixed and whose upper ends are made free, are used as a medium through which upward stream is passed to effect the treatment. However, it has been found that this apparatus leaves much to be desired if one wants to use it on a industrial scale.

Namely, in an industrial biological treatment facility, a very large quantity, e.g. several thousand $m^3$/day or more, of water must be treated. Therefore, quite a number of long fiber bundles must be disposed in the vessel to accommodate more microorganisms when an apparatus of the above style is constructed. As a result, enormous labor is needed in the disposal of a large number of the long fiber bundles in the vessel. Such labor should better be minimized to reduce the number of construction days and work costs.

Further, the apparatus, in which the upper ends of the long fiber bundles are made free, has an inherent shortcoming as described below, which has to be overcome. Namely, in an apparatus of the attached-growth type for biological treatment, a time-dependent variation takes place in the vessel in such a way that the amount of microorganisms growing on the medium, which is small in the beginning, increases gradually in accordance with the progress of the treatment. Even under such varying situations, however, it is necessary to maintain the condition under which the biological treatment by microorganisms is effected properly at all times. In the apparatus as proposed above, in which the upper ends of the long fiber bundles are made free, the long fiber bundles become gradually heavier with increasing amount of microorganisms growing thereon, leading to the tendency of settlement of all the bundles as a whole. However, when such settlement of the long fiber bundles once occurs, their density increases significantly in the lower section of the vessel with regard to its horizontal cross section. For example, in the treatment of a water containing relatively high concentrations of SS, etc., filtration takes place as the density of the fiber bundles in the lower section is increased, thus obstructing the inherent effective biological treatment by microorganisms. A filtration function adversely affects biological treatment because biological treatment requires passing large volumes of water.

SUMMARY OF THE INVENTION

In view of various problems involved in the prior art as described above and in the application, to industrial facilities, of an apparatus in which long fiber bundles prepared by binding monofilaments are utilized as a carrier or a medium for the fixation of microorganisms, an object of the present invention is to provide an apparatus which exhibits excellent effects as an apparatus for biological treatment and, for the first time, eliminates practically restrictions in the field of application object and in the construction of apparatus.

Another object of the present invention is to provide an apparatus for biological treatment which can further rationalize construction operation, etc. in the construction of such an apparatus for biological treatment, more specifically, which has a constitution capable of separating the final assembling operation at the site from the preassembling constitution and operation in the factory or the like.

A further object of the present invention is to provide an apparatus capable of realizing a particularly excellent treatment by aerobic microorganisms by the constitution using the above-described long fiber bundles as a medium or a carrier of the microorganisms.

The present invention which can achieve the above-described objects provides a biological treatment apparatus of the attached-growth type which comprises at least a medium on which microorganisms can settle and grow, a treatment vessel for housing said medium, a supply passage for feeding water to be treated into said treating vessel and a discharge passage for discharging the treated water, said medium being long fiber bundles formed by binding a large number of long monofilaments,
said long fiber bundles being disposed upward and downward in a zigzag formation in said treating vessel, the angle portions thereof being made substantially unmovable,
whereby the apparatus is made capable of feeding water to be treated into the treatment vessel through the supply passage provided in the upper or lower section of the vessel, treating said water biologically by contact with microorganisms settling and growing on the long fiber bundles and then discharging the treated water to the outside of the vessel through the discharge passage provided at the position in opposition to the supply passage of the treating vessel.

As a means to maintain the zigzag state of the long fiber bundles in the above-described apparatus, the bundles are disposed in a zigzag formation over rod- or pipe-like supports mounted in parallel in the upper and lower sections of the treating vessel and the upper and lower angle portions of said long fiber bundles are fixed with regard to the vertical direction (vertically immovable). Further, in the apparatus of the attached-growth type of the present invention, the upper and lower supports for long fiber bundles may constitute a part of an independent frame which can be accommodated in the treating vessel, so that the frame in which the long fiber bundles are disposed in advance in a zigzag formation can be assembled and fabricated separately from the treating vessel. The assembled frame can be inserted in the vessel on use and thus simplification of the facility and operation can be realized.

Further, the lower angle portions are affixed on the rod- or pipe-like lower supports incorporated with weights so as to make the portions vertically immovable with the weights, while the upper angle portions are allowed to hang on the rod- or pipe-like upper supports. Thus, simplification is realized in the fixation structure of the long fiber bundles.

Further, in a section of the frame assembled in advance as described above, a parallel pair of horizontal frame members is mounted at the lower part of the frame, and diffusers for vessel aeration are provided between and supported by a parallel pair of horizontal frame members. Moreover, when the columnar and horizontal frame members are made of pipe members and the pipes are used as air pipes connecting an outer air source and the diffusers, a further simplified apparatus can be constituted.

Owing to the constitution as described above, the biological treatment apparatus of the present invention can exhibit excellent effects as an apparatus for biological treatment by the use of long fiber bundles comprising an aggregate of monofilaments as a medium. Further, the apparatus can be applied even to a waste water with high SS concentrations and hence has no restrictions in the field of application object. Moreover, the apparatus can eliminate restrictions in the constitution of apparatus in such a way that it can pass water being treated either upward or downward.

The apparatus of the present invention can further rationalize its construction operation and the like. More specifically, it can separate the assembling operation in the site from the preassembling constitution and operation in the factory, so that an apparatus for biological treatment can be provided which shows a good work efficiency never seen in the past.

Moreover, the apparatus with the constitution according to the present invention, in which the long fiber bundles are used as a medium functioning as a carrier of microorganisms, can provide an extremely excellent treatment using aerobic microorganisms.

DETAILED DESCRIPTION AND THE PREFERRED EMBODIMENTS

Figure 1:
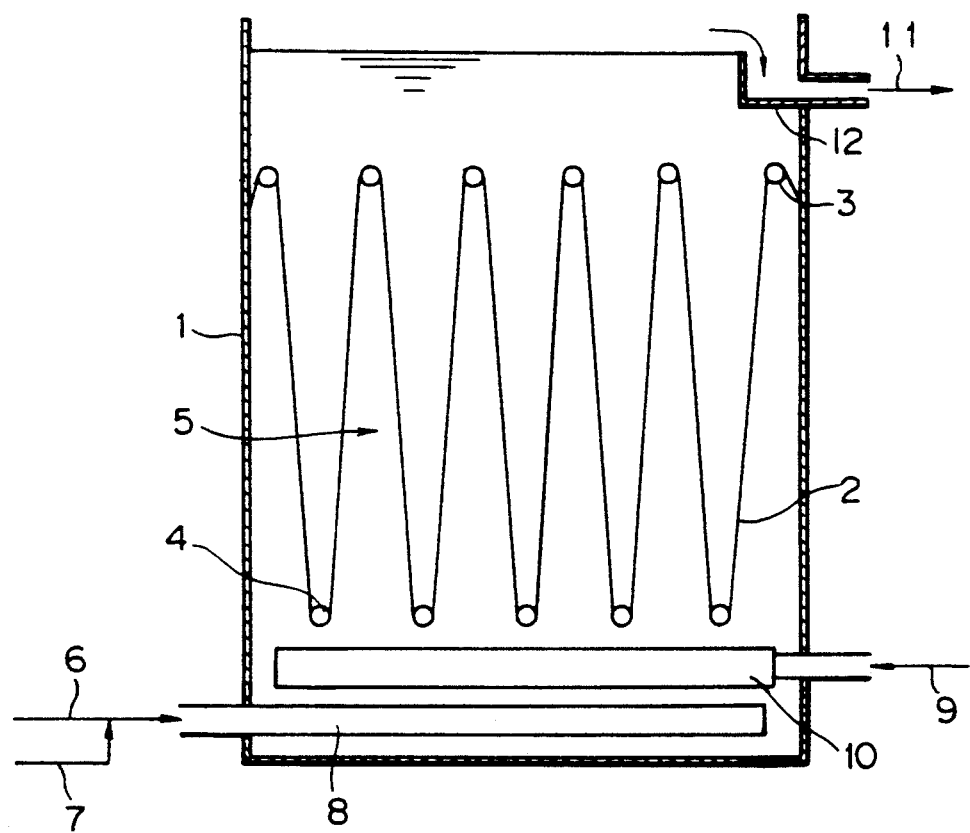
FIG. 1 is a schematic longitudinal section showing the constitution of the apparatus for biological treatment given in Example 1 of the present invention.

As described above, the present inventors developed an improved apparatus of the attached-growth type which employs long fiber bundles as a medium, the lower ends thereof being fixed, the upper ends being made free (Japanese Patent Laid-Open No. 227189/1990). The present invention has been developed on the basis of this technology. The process of the development is illustrated hereinbelow so that the technological meaning of the present invention will be clarified.

The excellence and insufficiency of Japanese Patent Laid-Open No. 227189/1990 are as described above. In order to solve the problems involved in said Laid-Open patent, it may be considered suitable at a glance to employ an apparatus in which the treatment is effected by passing a downward stream through long fiber bundles whose upper ends are fixed and whose lower ends are made free, contrary to the above constitution. However, such an apparatus is scarcely employed in practice. For example, in an apparatus in which the treatment is effected by aerobic microorganisms, aeration is generally carried out from the bottom of the vessel so that floating of fiber bundles raises a problem particularly in the early stage when the amount of the microorganisms grown is small. Further, in the treatment by anaerobic microorganisms, floating of the fiber bundles is unavoidable because of evolved methane.

Then, as a solution to the above-described problems, the applicant thought of a constitution of an apparatus in which both ends of a fiber bundle were fixed to vessel walls instead of making one end thereof free. According to this constitution, it has been found that the posture of the medium or fiber bundles is stabilized in spite of the situation in the vessel which varies with the progress of treatment, so that the desired proper void ratio can be maintained for a long time in the apparatus of the attached-growth type using fiber bundles, without inviting the filtration phenomenon due to settling or floating of the fiber bundles. However, although this constitution is excellent from functional view points, it has a practical or constructional problem such that quite a number of fiber bundles must be disposed in the vessel, with their upper and lower ends fixed. Even for the apparatus in which only one end of the fiber bundle is fixed as described above, improvement of its workability is demanded in the construction site of its industrial facility. Under such situations, easy application of the modified constitution can not be expected.

Therefore, it is further desired to meet rationally the requirements for the apparatus for biological treatment from a functional aspect or from the standpoint of stable long-term operation, as well as the demand for improving workability and construction costs upon installation or reconditioning of such an apparatus.

The present invention has a significant technological meaning in having materialized these requirements and demand. Namely, to accomplish the above-described objects, the present inventors have completed an apparatus for biological treatment, the characteristics of which is such that in a biological treatment apparatus of the attached-growth type in which water to be treated is passed through a treating vessel (simply abbreviated to "vessel" hereunder) housing a medium, on the surface of which microorganisms grow, so as to treat said water biologically by contact with said microorganisms, said medium is composed of long fiber bundles formed by binding a number of long monofilaments and the long fiber bundles are disposed upward and downward in a zigzag formation in the vessel, the angle portions of the upward and downward zigzag bundles being substantially immovable.

In order to dispose said long fiber bundle upward and downward in a zigzag formation in the vessel, a number of rod- or pipe-like supports are mounted horizontally in parallel in the upper section of the vessel and the fiber bundles are allowed to hand on the supports in a zigzag formation. Thus, the upper angle portions of the zigzag fiber bundles are fixed. The terminal portions of the fiber bundles can be bound to the walls of the vessel or said supports.

Further, the lower angle portions of the zigzag long fiber bundles may be fixed by providing, for example, the same supports as the upper supports in the lower section of the vessel and allowing the fiber bundles to turn around them. Alternatively, the lower angle portions may be substantially immovable in the vertical direction with weighted supports. Being substantially immovable can be accomplished by limiting movements of the lower angle portions in the vertical direction so that they may not float.

It is preferable to use long fiber bundles formed by binding long monofilaments of generally 10 μm–80 μm, preferably approx. 45 μm in size as those bundles constituting the medium of the apparatus of the present invention. These bundles may be bound intermittently at proper intervals for the sake of easy handling. However, it is not intended to exclude monofilaments with sizes other than those described above, and hence these monofilaments may be properly be employed depending on the strength or surface area of the fiber used.

Further, it is possible to utilize effectively voids in the long fiber bundles by making the bundles band-shaped in the disposal of the bundles in a zigzag formation.

No particular limitations are imposed on the long monofilaments which form the long fiber bundles. However, it is generally preferable to use acid- and alkali-resistant synthetic resin materials, for example, synthetic fibers such as acrylic fiber, polyester fiber and polyamide fiber.

Specifically, polyacrylamide, acrylamide-acrylic acid copolymers, acrylonitrile-vinylidene chloride copolymers, methyl acrylate-methacryl sodium sulfonate copolymers, alkid resins, unsaturated polyester resins, maleic acid resins, 6-nylon, 6,6-nylon, 6/10-nylon, etc. may be used. In addition, it is also possible to use polystyrene, high density polyethylene, low density polyethylene, etc. as well as natural fibers as occasion demands, regardless of the preparation processes of the monofilaments thereof. These monofilaments are generally obtained by means of melt spinning.

The growing of microorganisms on the long fiber bundles in the present invention is carried out in the same manner as in the conventional biological treatment apparatus of the attached-growth type.

Namely, when a water to be treated is fed to a treating vessel in which long fiber bundles are accommodated, microorganisms in the water proliferate on the surface of the fiber bundles and grow gradually to such an extent that they can be utilized for the biological treatment. Accordingly, the amount of microorganisms grown is insufficient so that BOD of the water is not reduced so much in the early stage of the growing operation. However, as the microorganisms grow increasingly on the fiber bundles, BOD of the treated water is decreased in due time to such a level that the BOD of the treated water is maintained constant at a low concentration. However, if the microorganisms grow excessively in the course of the treatment, excess of the microorganisms is to be taken out by washing. Since only excessive microorganisms are removed by this washing, the microorganisms remain in the apparatus after washing in an amount enough to use it as an apparatus for biological treatment.

Thus, it is sufficient if the above-mentioned growing operation of microorganisms is carried out only in the beginning. In the growing operation of microorganisms, it is possible that a small amount of activated sludge obtained externally is added in advance to the apparatus or mixed with a water to be treated, so as to reduce the growth time.

No restriction is imposed on the kind of the microorganisms used. Hence, there may be mentioned, for example, Achromobacter, Alcaligenes, Bacillus, Bacterium, Flavobacterium, Pseudomonas, etc. which can be inherently present in water to be treated. The microorganisms may generally include all of those to be used conventionally in the biological treatment, including protozoa.

The density of monofilaments which constitute long fiber bundles used in the present invention is approximately 0.9-1.30 g/cm$^3$. The long fiber bundle is an aggregate of monofilaments and may suitably be used in an amount of 5-20 kg per m$^3$ of the vessel. In this case, the surface area of the bundles in the vessel amounts to 500-2,000 m$^2$/m$^3$. The diameter of a monofilament used is generally 10-80 μm.

The zigzag width (vertical width) and the zigzag pitch of the upward and downward snaking of the long fiber bundle may generally be so determined that the width is 60-80% of the effective depth of the vessel and the pitch is approx. 100-300 mm.

In order to obtain an effective contact between water being treated and microorganisms on the long fiber bundles, it is useful to allow the bundles to snake (zigzag) upward and downward. If the bundles are snaked right and left by way of example, their disposal will be complicated and uniformity of the bundles may hardly be obtained, resulting readily in their partial clogging.

Next, in the apparatus of the present invention, the amount of the long fiber bundles to be filled in the vessel is not particularly limited, and also it can not be determined indiscriminately due to the different qualities of water to be treated. However, it is often preferable to fill the fiber bundles generally in an amount of approx. 5-50 kg (dry basis) per m$^3$ of the vessel or so as to attain a void ratio of approx. 95-99.5%.

When monofilaments with a density of 1 g/cm$^3$ are used, a filling amount of 5-50 kg/m$^3$ corresponds to a void ratio of 99.5-95%. However, where monofilaments of other densities are used, it is sufficient if either the filling amount or the void ratio is satisfied. As the filling amount is increased (or the void is decreased), partial clogging of the bundles is liable to occur, whereas as the filling amount is decreased (or the void is increased), microorganisms grow on the fiber bundles to a lesser extent. In any case, it is effective and preferable from view points of installation and operation to obtain as large a surface area as possible with a small amount of a filler. A filling amount of 5-50 kg/m$^3$ corresponds to a surface area of approx. 500-5,000 m$^2$/m$^3$.

By using such an amount of a filler, it is possible to secure a very large quantity of microorganisms growing on the fiber bundles as compared with conventional cases where yarn or string is used as a medium. Further, the void can be 2-3 times and the surface area be 10-50 times as much as those of the cases where conventional granular media are used. Thus, the apparatus of the attached-growth type of the present invention can now have very suitable medium layers for its purpose.

In a particularly preferred embodiments of the present invention, a number of parallel rod- or pipe-like supports are so formed as to be situated in the upper section (and further in the lower section) of the vessel as a part of a frame assembled three-dimensionally in advance together with such frame members as columnar members, horizontal members and reinforcing members so as to dispose the long fiber bundles therein, the frame then being inserted in the vessel. In this case, it is also preferable to dispose the long fiber bundles in the frame in advance in a zigzag formation and then insert the frame in the vessel.

Further, in a part of the frame previously assembled as described above, a parallel pair of horizontal members is mounted at the lower part of the frame (below the lower angle portions of the long fiber bundles) and diffusers for vessel aeration are provided between and supported by the parallel pair of horizontal frame members. Moreover, the columnar and horizontal frame members of the frame are composed of pipe members and these pipes are utilized as air pipes connecting an outer air source and the diffusers. Thus, a more simplified apparatus is advantageously formed from a structural point of view.

In the apparatus of the present invention, the medium is affixed practically in a zigzag formation, so that the apparatus can be employed not only as an apparatus for aerobic microorganism treatment where aeration is effected from the bottom of the vessel but also as that for anaerobic microorganism treatment. Moreover, the apparatus can be used by passing water being treated either upward or downward.

Particularly, when the present invention is applied to an aerobic microorganism treatment, it is advantageously possible to provide an apparatus for biological treatment by aerobic microorganisms which has a high volume treatment capacity never seen in the past, by using, as a means of aeration, diffusers producing air bubbles with a diameter of 1 mm or less, preferably 0.8 mm or less, such as fire hose, or those formed by using a cloth including canvas sheet.

Further, the supply passage for feeding water to be treated into the vessel may be provided at either the top or bottom part of the vessel. However, it is preferable to provide the supply passage at the bottom part of the vessel, below the lower angle portions of the long fiber bundles or near the bottom of the vessel, to provide a discharge passage at the top part of the vessel, above the upper turning parts of the long fiber bundles or at the position to which the water is overflowed from the top part of the vessel, and to pass the water upward in the vessel.

This simplifies the structure for passing water through the vessel and permits effective biological treatments. Both the supply and discharge passage can be made of an ordinary pipe, and the supply passage can also serve as a supply passage of washing water used in washing the long fiber bundles. Here, the supply passage for feeding waters to be treated into the vessel is referred to as a raw water pipe, the supply passage for feeding washing water as a washing water pipe, the discharge passage for discharging treated waters from the vessel as a delivery pipe, and a pipe communicated to the supply passage and distributing the water or washing water into the vessel as a distributor, each of which can be fabricated based on the prior art.

No particular limitations are placed on the uses and application object of the apparatus of the present invention. However, in particular, the apparatus displays excellent effects when used to treat water containing 100 ppm or more of SS. For example, when the apparatus is employed to treat waste waters from paper mills and food industries, it shows excellent effects never experienced in the past. It is quite feasible to operate the apparatus on an industrial scale of approx. 10-10,000 tons/hour in the amount of water treated. Moreover, for the same capacity of treatment, the apparatus can be made more compact than the conventional ones.

EXAMPLES

The present invention will be illustrated more specifically on the basis of the following examples with reference to the accompanied drawings.

EXAMPLE 1

FIG. 1 is a schematic cross section showing an embodiment of the present invention, which illustrates a attached-growth apparatus of the upward flow type using aerobic microorganisms.

Numeral 1 is a rectangular vessel (circular vessel is also allowed as a matter of course), in which a plurality of rod supports 3 for hanging band-shaped long fiber bundles 2 are fixed in parallel in the upper section. Further, in the bottom section of the vessel are fixed horizontally in parallel a plurality of holding rods 4 for substantially affixing the lower angle portions of said band-shaped long fiber bundles 2 so that the bundles 2 do not float.

In this way, the long fiber bundles 2 are disposed in a zigzag formation from the standing wall on one side of the vessel to that on the other side, and medium layer 5 are formed as a whole, composed of a number of long fiber bundles 2 disposed relatively densely (small intervals are allowable) in the width direction.

Numeral 8 is a water distributor provided in the bottom section of the vessel and branched outside the vessel, one branch being connected to raw water pipe 6 and the other to washing water pipe 7. The water distributor 8 has many holes to distribute uniformly water to be treated into the vessel. Numeral 10 is an air diffuser having a great number of pores, made of a cloth, such as fire hose, which is connected to air pipe 9 outside the vessel.

Numeral 12 is a trough provided on the top wall of the vessel, connected to delivery pipe 11 for discharging treated water outside.

Then, explanation will be made on the operation of the apparatus of the attached-growth type constituted as above. In the apparatus, water to be treated is fed into the vessel through the holes of the water distributor 8 by way of the raw water pipe 6. On the other hand, aeration air is fed via the air pipe 9 to the air diffuser 10 made of a hose cloth, from which are aerated minute air bubbles with a diameter of ca. 1 mm or less.

Thus, the water flows upwards in the vessel 1 in which said long fiber bundles 2 are disposed in a zigzag formation in bands, and organic matter in the water is oxidized and decomposed biologically to proceed purification of the water by the activity of aerobic microorganisms growing on the surface of each monofilament of the long fiber bundles 2.

The water purified while flowing upwards in the vessel is passed to the trough 12 and then discharged outside through the delivery pipe 11. The air aerated into the vessel 1 ascends as bubbles through the vessel and directly discarded to the air.

Although SS contained in the water is caught partially by the long fiber bundles 2, the majority rises through the bundles 2 and is discharged outside together with the treated water. The SS is separated from the treated water by such solid-liquid separation means as settling tank and flotation tank.

By using the apparatus of the attached-growth type of this example constituted as described above, SS in a water being treated is caught or accumulated to a lesser extent than by employing the conventional apparatus using granular materials as a medium. Moreover, the apparatus of this example has a large void so that blinding of the apparatus tends to occur very scarcely. Furthermore, since the long fiber bundles are substantially fixed in a zigzag formation, their floating or settling can not occur even if the condition in the vessel varies with time, and hence a stable treatment can be carried out at all times.

Further, the above apparatus uses, as a medium, a long fiber bundle that is an aggregate of monofilaments, and the surface area of a monofilament, a unit body on which microorganisms grow, is extremely large, for example, 10-50 times as large as that of conventional granular media on calculation. Hence, the amount of microorganisms carried in the medium layer is remarkably increased and therefore a high load of biological treatment can be realized. Further, construction labor, when the long fiber bundles are used as a medium, can also be saved greatly owing to the constitution of disposing the bundles in a zigzag formation.

In the apparatus of this example, clogging tendency is very small as described above. However, as a result of long-term water passing, the amount of SS caught by the long fiber bundles 2 is progressively increased, and it is also unavoidable that the organism films growing on the long fiber bundles 2 is eventually thickened. In consequence, a washing operation is necessary, which is carried out in the following manner, although its frequency is quite low compared with the conventional apparatus.

First, washing air is introduced into the vessel through the diffuser 10 via the air pipe 9 at a flow rate higher than that of the aeration air used during water passing. By this air introduction, the water in the vessel is agitated and SS caught in the long fiber bundles is easily released and floated. The air introduction also separate excess aerobic microorganisms grown on the surface of the monofilaments constituting the long fiber bundles 2. In this case, to facilitate vibration and fluctuation of the long fiber bundles, it is preferable to allow the zigzag disposal of the bundle to have some looseness.

Then, by either continuing or stopping the introduction of washing air, washing water is passed into the vessel through the washing water pipe 7 to expel the excess aerobic microorganisms and SS released as described above. Afterward, the water containing a large amount of these muddy materials is discharged and recovered as a washing waste through the delivery pipe 11 via the trough 12. In this way, a washing operation of the apparatus of the attached-growth type of this example can be conducted.

In this case, since the apparatus of this example employs, as a medium, long fiber bundles disposed firmly upward and downward in a zigzag formation, the bundles will not be displaced even with a high speed flow of washing water. Thus, washing operation can be effected for the efficient elimination of clogging in a short time.

EXAMPLE 2

Figure 2:
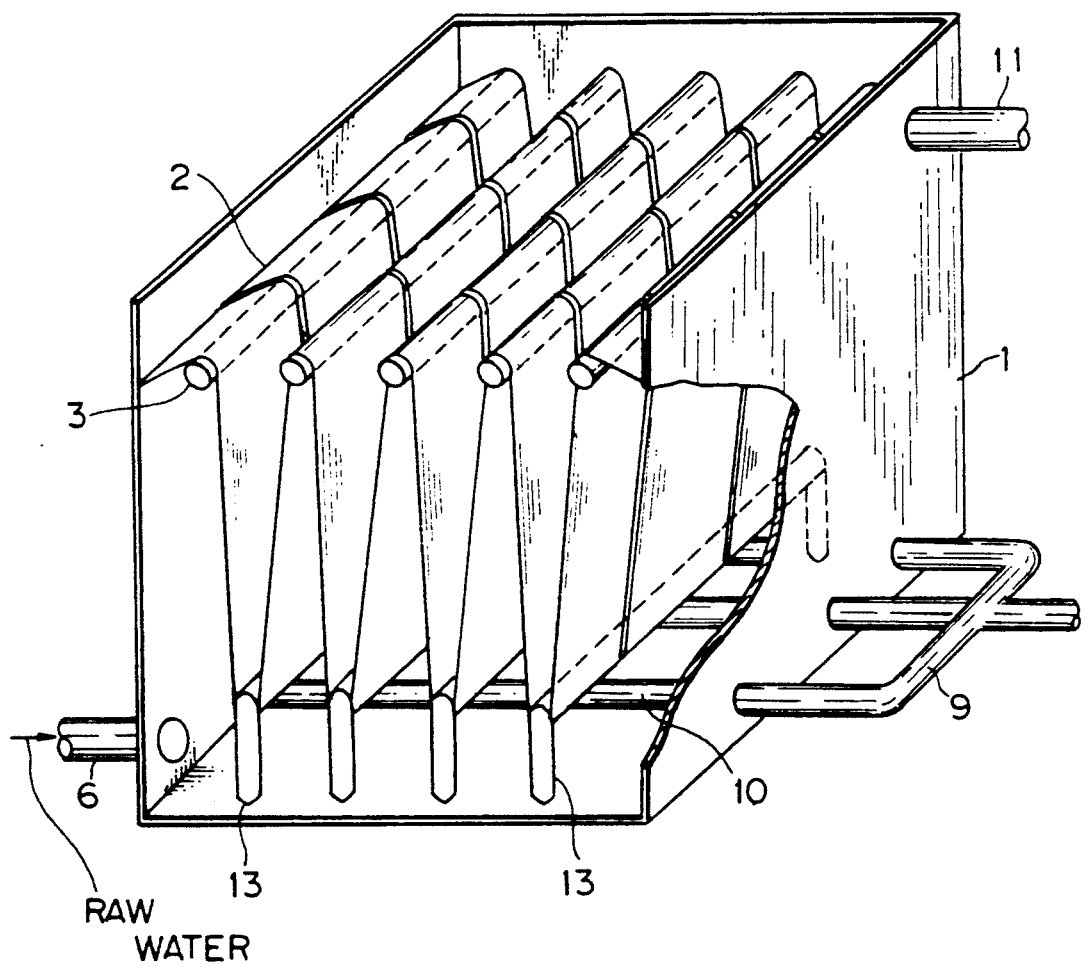
FIG. 2 is a schematic cut-away view showing the principal constitution of the apparatus for biological treatment given in Example 2 of the present invention.

In this example illustrated by FIG. 2, the apparatus has approximately the same constitution as that of Example 1 except that weights 13 are allowed to hang to be immovable, in the vertical direction, the lower angle portions of the long fiber bundles 2 disposed upward and downward in a zigzag formation. The common members are assigned with the same numbers as those in Example 1 so that their explanation is omitted.

The weight 13 of this example comprises a rod part extended in the width direction and vertical parts drooping down from the ends of the rod part so that it can be allowed to hang commonly on a plurality of the long fiber bundles disposed in the width direction.

According to the constitution of this example, a merit is in that a structure is readily formed for the substantial fixation of the long fiber bundles.

EXAMPLE 3

Figure 3:
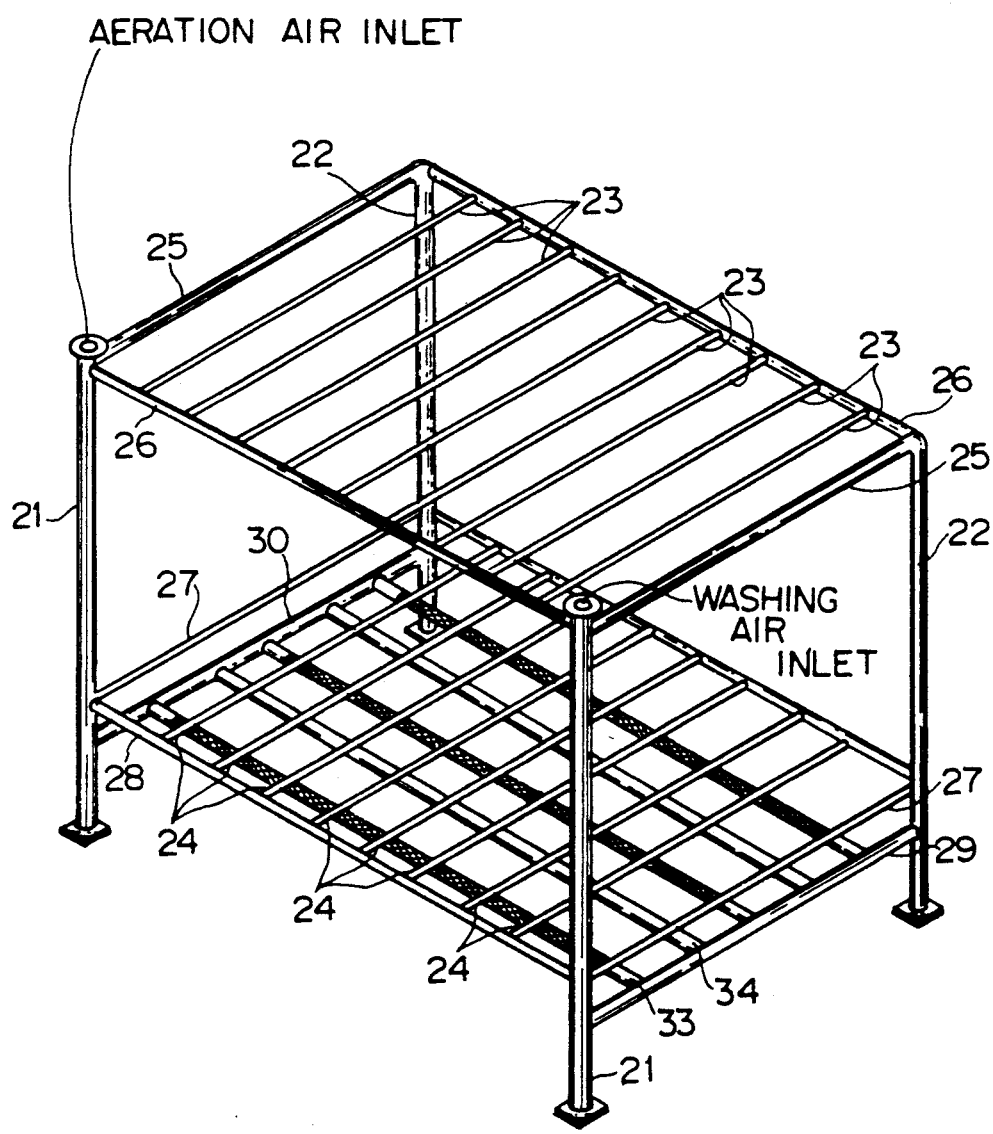
FIG. 3 is a schematic cut-away view of the frame used in the apparatus for biological treatment given in Example 3 of the present invention.
Figure 4:
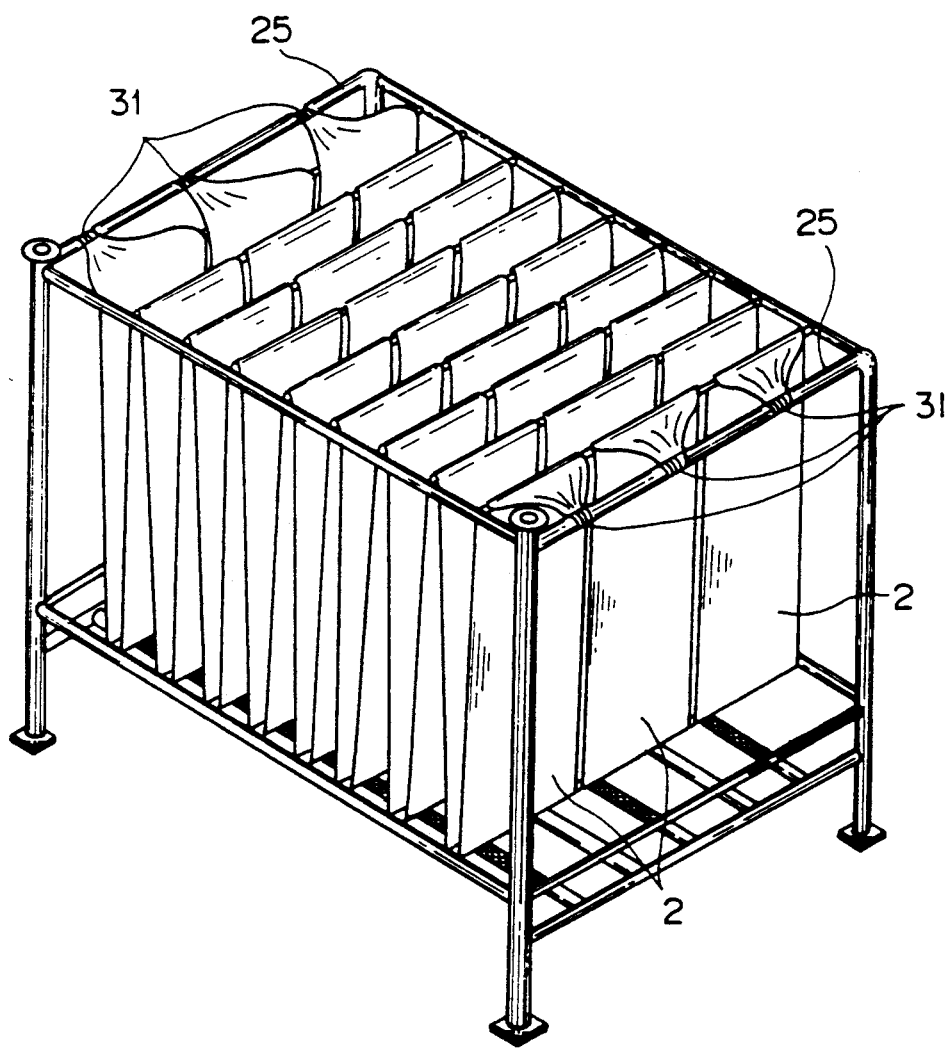
FIG. 4 is a schematic cut-away view of the condition under which long fiber bundles are disposed in the frame of Example 3.

In this example illustrated by FIGS. 3 and 4, an embodiment is given in which supports mounted in parallel in the upper section of a vessel is formed as a part of a frame assembled three-dimensionally in advance together with such frame members as columnar members, horizontal members and reinforcing members. In the drawings, numerals 21 and 22 are columnar frame members, numerals 25, 26, 27 and 28 are horizontal frame members, numeral 23 represents supports over which the upper angle portions of long fiber bundles 2 hang and numeral 24 shows supports around which the lower angle portions of long fiber bundles turn. Since such a frame of this example can be fabricated separately from the vessel, it is advantageously possible first to dispose the long fiber bundles 2 over the supports upward and downward in a zigzag formation as shown in FIG. 4, then to bind both ends of the bundles to the horizontal frame members 25, and to install the frame in the vessel. Here, numeral 31 shows the binding portions to horizontal frame members 25.

The frame of this example is composed of pipe members in such a way that one of the columnar frame members 21 is used as an air pipe for introducing aeration air, while the other is used as that for introducing washing air. Further, a pair of pipe-made horizontal frame members 29 and 30 are provided at the lower part of the frame, and aeration diffusers 33 and washing diffusers 34 are arranged between them. In consequence, air can be introduced from the outside through the columnar and horizontal frame members composed of pipe members. The frame of this example also has such constitutional characteristics.

According to this constitution, no particular work is needed for the installation of separate aeration and washing diffusers in the vessel.

EXAMPLE 4

Figure 5:
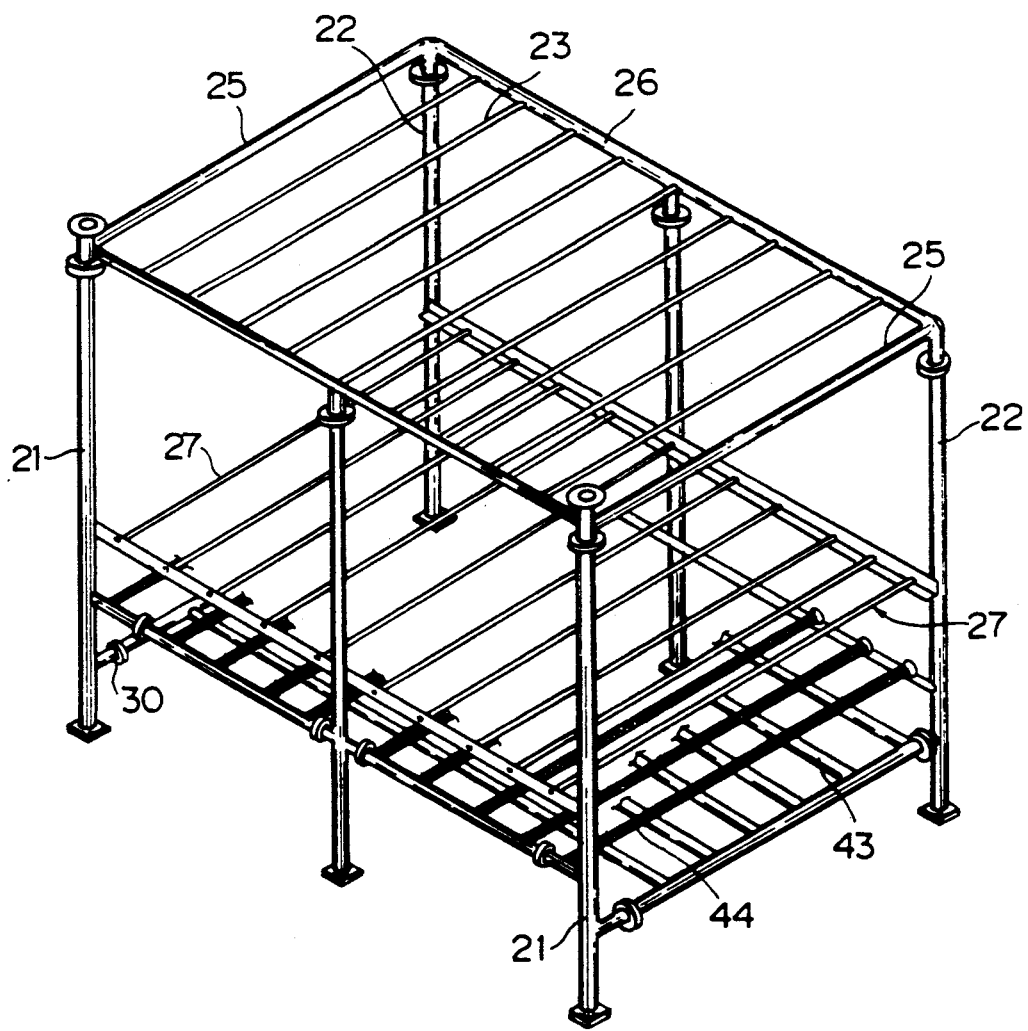
FIG. 5 is a schematic cut-away view of the principal part of the frame used in the apparatus for biological treatment given in Example 4 of the present invention.

FIG. 5 shows a modification of the frame given in the foregoing Example 3 illustrated by FIG. 3. The feature of this example is in that a number of washing diffusers 43 are provided in the lowest section of the frame and aeration diffusers 44 are mounted in crossing above the washing diffusers 43. The other structure is substantially identical to that of Example 3. Hence, the same numbers are assigned to the same members and their explanation is omitted.

In the apparatus of the dipping filter bed type in which the vessel is formed using the frame constituted in this way, aeration can be effected, for instance, from both of the washing diffusers 43 and the aeration diffusers 44 during washing so that washing air can beneficially be provided in all over the vessel.

EXAMPLE 5

Figure 6:
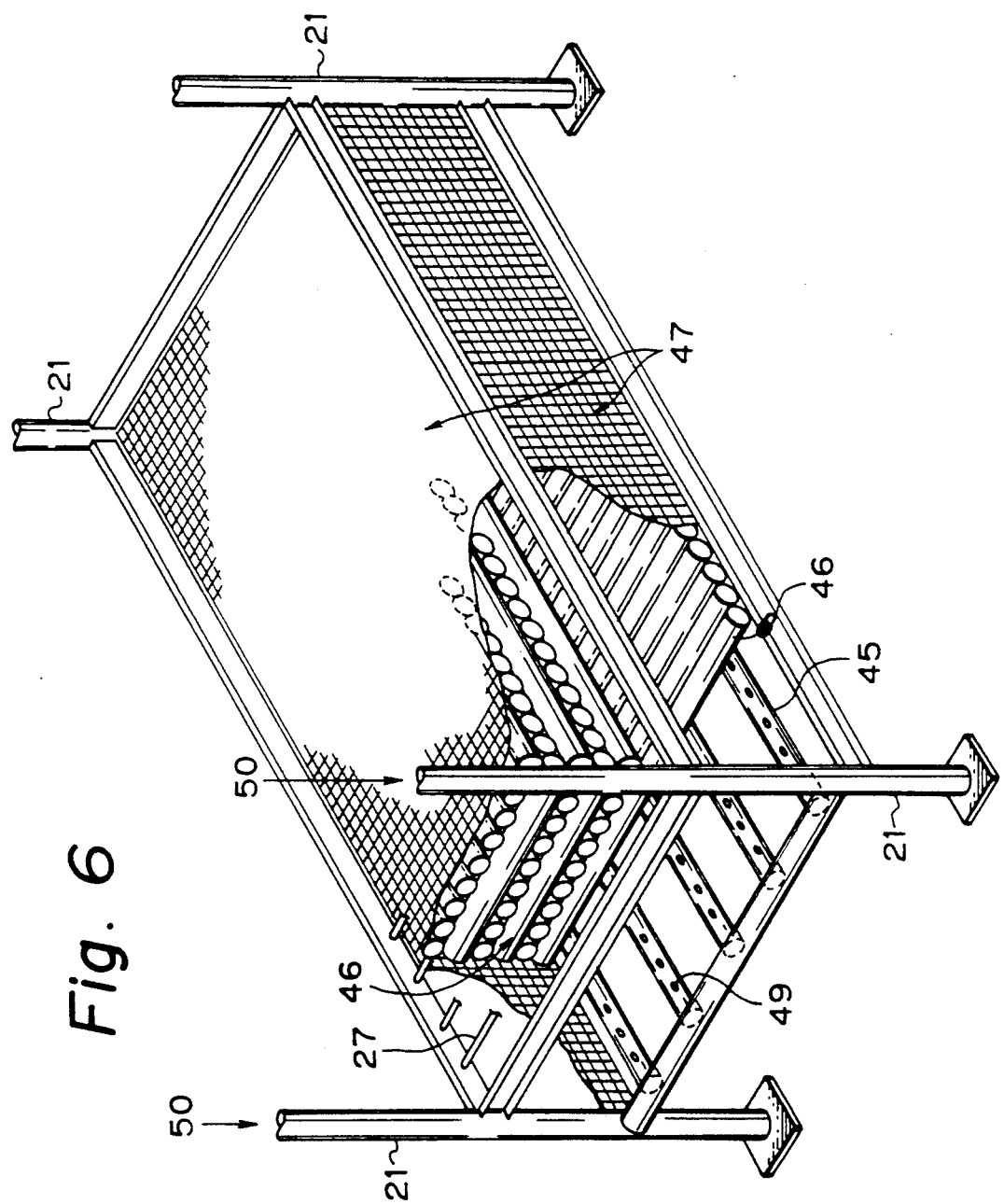
FIG. 6 is a schematic cut-away view of the principal structure of the lower part of the frame used in the apparatus for biological treatment given in Example 5 of the present invention.

FIG. 6 shows a modification of the lower part of the frames given in FIGS. 4 and 5. The feature of this example is in that mesh pipes 46 are arranged in 6 layers in alternating directions between common diffusers 45, which serve as both aeration and washing diffusers, and horizontal frame members 27, around which the lower angle portions of long fiber bundles turn, and the upper portion and both sides of the mesh pipes 46 are covered by latticed plastic nets 47.

The other structure is substantially identical to that of Example 4. Hence, the same numbers are assigned to the same members and their explanation is omitted.

Where the mesh pipes 46 arranged in many layers alternating in direction above the common diffusers 45 in this way, the laminated layers of the mesh pipes 46 can be used as a diffusing body, so that it is not necessary to use, as the common diffusers, pipes with many pores made of cloth, such as fire hose, as shown in FIG. 1. Hence, a pipe with holes 49 of approx. 3-10 mm diameter, for example, can be used as the common diffuser 45.

Namely, when air 50 for aeration or washing is fed through a columnar frame member 21, bubbles ejected from the relatively large holes 49 turn into minute bubbles with a diameter of 1 mm or less while passing through the laminated layers of the mesh pipes 46.

TEST EXAMPLE 1

In a attached-growth apparatus of the upward flow type having the constitution shown in FIG. 1, which comprised a vessel made of steel with a breadth of 3,000 mm, a depth of 1,000 mm and a height of 4,000 mm (effective volume: 10 m$^3$), long fiber bundles comprising an aggregate of acrylic monofilaments with a size of 45 μm (density: 1.05 g/cm$^3$ surface area: 1,000 cm$^2$/cm$^3$) were disposed stretchedly in bands upward and downward in a zigzag formation (zigzag vertical width: 3,000 mm, zigzag pitch: 150 mm, zigzag number: 20) so as to attain a packing density of 10 kg/m$^3$ and a void ratio of 99%. Two hose-shaped diffusers made of cloth with a diameter of 50 mm were provided in the bottom section of the vessel 1. Then, a mixed waste of DKP and DIP, a waste water of a paper mill (average BOD concentration: 337 mg/liter, BOD load per volume: 3 kg/m$^3$ day), was passed into the vessel at the bottom, and at the same time aeration air was introduced from the bottom of the vessel through the diffusers 10 at an LV of 25 m/H, thereby conducting an aerobic microorganism treatment.

Washing was carried out once every two days by introducing aeration air at an LV of 50 m/H and then washing water at an LV of 10 m/H.

Operation was continued for 30 days under conditions. As a result, the average quality of the treated water was 28 mg/liter for BOD under steady state, while the average removal rate was 92%. In the apparatus of this example, the posture of the long fiber bundles was stable and hence no rapid increase was seen in the load by passing water.

COMPARATIVE TEST EXAMPLE

For comparison, artificial stones having a diameter of 10–30 mm and a specific gravity of 1.2 were packed in a vessel made of steel with a diameter of 650 mm and a height of 4,000 mm (straight part) so as to attain a packed height of 3,000 mm (packed amount: 600 kg, void: 50%), thereby constituting a dipping filter bed apparatus of the upward flow type. Using this apparatus, an aerobic microorganism treatment was conducted under exactly the same conditions as those in the foregoing Test Example 1 except that washing operation was carried out once a day. As a result, the average quality of the treated water was 43 mg/liter for BOD and the average removal rate was 87%. In spite of a higher frequency of washing than that of Test Example 1, the quality of the treated water was inferior.

TEST EXAMPLE 2

Provision was made with the apparatus of Test Example 1 equipped with diffusers made of cloth tubes having a diameter of 50 mm, which were generally used for fire hose, and with an apparatus equipped with diffusers formed by boring 6-mm holes in 50-diameter pipes at intervals of 250 mm. Then, using these apparatus, aerobic microorganism treatments were carried out under the same conditions as specified below. Namely, a mixed waste of BKP and DIP was passed into the vessel at the bottom (a waste water with an average BOD concentration of 400 mg/liter was charged at a BOD load per volume of approx. 4 kg/m$^3$ day) and at the same time aeration air was introduced through the bottom of the vessel at an LV of 25 m/H, thereby conducting an aerobic microorganism treatment. Washing was carried out once every two days by passing washing air at an LV of 50 m/H and washing water at an LV of 10 m/H.

Operation was continued for 15 days under these conditions. As a result, with the foregoing pipe diffusers having 6-mm holes at intervals of 250 mm, the average quality of the treated water was 72 mg/liter for BOD and the average removal rate was 82%, whereas with the apparatus provided with the cloth-made hose-type diffusers, the average quality of the treated water was 52 mg/liter and the average removal rate was 87%. Thus, it has been confirmed that where the apparatus of the dipping filter bed type of the present invention is used as a treatment apparatus by aerobic microorganisms, it is suitable to produce bubbles with a diameter of 1 mm or less using diffusers made of hose-shaped cloth as a means of aeration from the viewpoint of performing a performed biological treatment.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An apparatus for aerobic microorganism treatment of waste water such as that with SS (suspended solids) of 100 ppm or more, of the attached-growth type, comprising:
    (a) a treatment vessel which is provided with a supply passage in a lower or upper section thereof for feeding the water to be treated into said treatment vessel and a discharge passage, at a position in opposition to said supply passage, for discharging the treated water;
    (b) a frame accommodated in said treatment vessel supporting long fiber bundles which are formed by binding a large number of long monofilaments made of a synthetic resin with a diameter of 10 to 80 μm and which are disposed upward and downward in a zigzag formation on a number of rod- or pipe-like supports constituting the upper and lower portions of said frame and fixed at the upper and lower angle portions in such a way that said long fiber bundles have a surface area of 500 to 2,000 m$^2$/m$^3$ in said treatment vessel and said treatment vessel has a void ratio now lower than 95%; and
    (c) diffusers in a lower section of said treatment vessel for diffusing bubbles for promoting biological reactions wherein the diffusers have holes of 3 to 10 mm in diameter and above which a mesh of pipes is arranged in many layers alternating in direction providing means for breaking up the bubbles diffused from the diffuser.

2. An apparatus for aerobic microorganism treatment as claimed in claim 1, wherein a part of the frame members constituting the frame are made of pipe members and these pipe members compose air pipes connecting an outer air source and the diffusers.

3. An apparatus for aerobic microorganism treatment as claimed in claim 1 or 2, wherein horizontal frame members are provided at the lower part of the frame below the lower fixed angles of the long fiber bundles and the diffusers for vessel aeration are arranged between the horizontal frame members.

4. An apparatus for aerobic microorganism treatment as claimed in claim 1 or 2, wherein the diffusers and mesh of pipes form means to provide bubbles having a diameter of 1 mm or less.

5. An apparatus for aerobic microorganism treatment as claimed in claim 1 or 2, wherein said zigzag formation has a vertical width of 60 to 80% of the effective depth of the treatment.

6. A method of aerobic microorganism treatment of waste water having SS (suspended solids) of 100 ppm or more, comprising the steps of:

feeding said water into a treatment vessel through a supply passage provided in an upper or lower section of said treatment vessel which accommodates a frame housing long fiber bundles and is provided with diffusers in the lower section thereof for diffusing bubbles, said long fiber bundles formed by binding a large number of long monofilaments made of a synthetic resin with a diameter of 10 to 80 μm, said long fiber bundles being disposed upward and downward in a zigzag formation on a number of rod- or pipe-like supports provided in the upper and lower sections of the frame and fixing the upper and lower angle portions of said long fiber bundles in such a way that said long fiber bundles have a surface area of 500 to 2,000 $m^2/m^3$ in said treatment vessel and said treatment vessel has a void ratio not lower than 95%, said diffusers having holes of 3 to 10 mm diameter and above which a mesh of pipes is arranged in many layers alternating in direction which serves to break up bubbles passing through the layers;

treating said water biologically by contact with aerobic microorganisms settling and growing on the long fiber bundles while diffusing bubbles into the water with said diffuser to promote biological reactions; and then discharging the treated water from the vessel through a discharge passage provided at a position in opposition to the supply passage of the treatment vessel.

7. A method of aerobic microorganism treatment of water as claimed in claim 5, wherein the broken up bubbles have a diameter of 1 mm or less.

* * * * *